United States Patent [19]

Baio et al.

[11] 4,114,028
[45] Sep. 12, 1978

[54] OPTICAL PUNCHED CARD READER

[75] Inventors: Alfred R. Baio, New Rochelle; David L. Genovese, Spring Valley, both of N.Y.

[73] Assignee: Sealectro Corporation, Mamaroneck, N.Y.

[21] Appl. No.: 800,732

[22] Filed: May 26, 1977

[51] Int. Cl.² ............................................. G06K 7/10
[52] U.S. Cl. .................................... 235/458; 235/474; 235/482
[58] Field of Search .............. 235/61.11 E, 458, 474, 235/482; 250/569

[56] References Cited

U.S. PATENT DOCUMENTS

| | | | |
|---|---|---|---|
| 3,496,342 | 2/1970 | Milford | 235/61.11 E |
| 3,586,833 | 6/1971 | Schafer | 235/61.11 E |
| 3,627,990 | 12/1971 | Sallach | 235/61.11 E |
| 3,959,627 | 5/1976 | Sonier | 235/61.11 E |
| 3,961,160 | 6/1976 | Gorgens | 235/61.11 E |
| 3,993,893 | 11/1976 | Graf | 235/61.11 E |

*Primary Examiner*—Daryl W. Cook
*Attorney, Agent, or Firm*—Anthony J. Casella; Joseph A. Calvaruso

[57] ABSTRACT

A punched card reader includes a base member for slidably receiving a punched data card having a plurality of columns and rows. Along one edge of the base member is a row of apertures corresponding in number and spacing to the rows on the data card. The base member further includes a centrally located strobe aperture. A strobe generator is slidably mounted on one face of the base member. The strobe generator includes a central column of slots disposed perpendicular to the row of apertures on the base member and disposed so as to pass over the strobe aperture as the inserted data card displaces the strobe generator away from the row of apertures on the base member. The slots correspond in number and in spacing to the columns on the data card. Adjacent to one face of the base member is a plurality of light sources aligned with the row of apertures and centrally located strobe aperture. Adjacent to the other face of the base member is a plurality of light sensors aligned with the row of apertures and central strobe aperture of the base member. As the data card is inserted into the reader the punched holes of the card create a signal received by the row of light sensors. Simultaneously as the card displaces the strobe generator a strobe signal is received by the sensor aligned with the strobe aperture. The combination of signals provides the correct data input. The subject reader further includes means for detecting the correct position and orientation of a card as well as the last readable position on the card.

16 Claims, 5 Drawing Figures

OPTICAL PUNCHED CARD READER

BACKGROUND OF THE INVENTION

The subject invention relates to static punched card readers, and specifically to optical punched card and badge readers. These devices are typically used as programming devices for holding fixed instructions or data such as parameter values, and are particularly useful in data acquisition systems such as security systems, hospitals, parking lots, time clocks, data collection and process control.

As is well known, optical card readers transform the punched holes in the data cards into electrical impulses by means of photoelectric cells which are activated as the punched card passes over a light source. The generated signals are then carried by well known circuitry to a read out terminal or device. Known optical card readers have several shortcomings, however. Some known readers have a sensor for each column and row of the data card. As a result, external means of scanning the data field is required. Discrimination of responses occurs subsequently. Other card readers have sensors for each row of the data card. When the card is inserted into the reader it is transported by a drive mechanism. This provides a time base which enables discrimination of responses along the rows and columns. Another similar type of reader includes sensors along the columns of the data card. However, insertion of the card is performed manually, and discrimination of responses obtained by external electronic scanning.

In addition, many of the known readers are not completely reliable and do not provide full validity checks. Further, they are often complex in structure resulting in greater chance of breakdown as well as higher manufacturing costs.

Accordingly, it is an object of the subject invention to provide an optical punched card reader that does not require external scanning or discrimination means.

It is another object of the subject invention to provide an optical punched card reader that is completely reliable and provides full validity checks.

It is further object of the subject invention to provide an optical punched card reader having the above characteristics which is simple in construction and economical to manufacture.

SUMMARY OF THE INVENTION

The punched card reader of the subject invention includes a base member for slidably receiving a punched data card having a plurality of columns and rows. Along one edge of the base member is a row of spaced apertures which correspond in number and spacing to that of the rows on the data card. The base member also includes a centrally located strobe aperture. In addition, it is preferable that the base member include a pair of elongated raised portions perpendicular to the row of apertures, and extending from said row of apertures to an intermediate portion of the base member. The raised portions are preferably spaced a distance approximately equal to the length of the data card so that said raised portions form a rigid track for receiving and guiding the inserted data card.

The subject reader further includes a strobe generator which is slidably mounted on the base member. Preferably, the base member includes a rectangular portion of reduced thickness (between the raised portions) disposed perpendicular to the row of apertures, and extending from said row of apertures to the opposite edge of the base member thus forming a channel for receiving the strobe generator. The strobe generator includes a column of slots disposed perpendicular to the row of apertures on the base member. The number and spacing of the slots corresponds to that of the columns on the data card. In addition, the slots are so disposed that when a data card is inserted into the reader, thus displacing the strobe generator away from the row of apertures of the base member, the slots pass over the strobe aperture of the base member intermittently covering said aperture. Preferably, the strobe generator is spring biased so as to return to its normal position after the inserted data card has been removed. In addition, the strobe generator preferably has two arm members disposed perpendicular to the column of slots.

Mounted on the base member, over the strobe generator, is a base cover plate which is of substantially the same configuration as the base member. The cover plate includes a row of spaced apertures and a central aperture aligned with the row of apertures and strobe aperture, respectively, of the base member.

Mounted on the other face of the base member is a first printed circuit board which includes a row of spaced light sources, typically, light emitting diodes (LED's), which are aligned with and extend into the row of apertures of the base member. The printed circuit board also includes a centrally located LED which is aligned with and extends into the strobe aperture of the base member. The board also contains circuitry for connecting the board to a power source and read-out device.

Mounted on the base member cover plate is a second printed circuit board which includes a row of spaced light sensors, typically phototransistors, which are aligned with and extend into the row of apertures of the base member cover plate. In addition, said printed circuit board further includes a centrally located phototransistor aligned with and extending into the central aperture of the base member cover plate. The circuit board also includes circuitry for connecting the board to a power source and read-out device.

The subject reader further includes means for detecting the correct position and orientation of the inserted data card as well as the end of said card. Typically said means comprises further apertures, light sources and light sensors, appropriately disposed such that appropriate light signals, depending upon the dimensions of the card and its location in the reader, will be transmitted to the read-out device. If the card is not properly positioned or oriented an improper combination of signals will be transmitted which will not be accepted by the read out device, i.e. the signals transmitted will be nonfunctional. Similarly, if data signals continue to be generated after the reader has transmitted a signal indicating the end of a valid card, the data transmitted will not be processed.

In operation, as a punched card is inserted into the reader, the columns of the card will pass over the row of apertures of the base member. Where a punched hole exists a light signal will be transmitted from an LED, through an aperture of the base member and cover plate, and will be received by the phototransistor aligned therewith. Simultaneously, the card being inserted displaces the strobe generator causing its slots to pass over strobe aperture and the LED aligned therewith creating a series of intermittent light signals corresponding in number and spacing in the columns of the data card. As a result, for each data point on the punched card (each point has a row component and a column component) its row component will be sensed by the light signal from the row of apertures on the base member while simultaneously its column component will be sensed by the signal created by the strobe generator. Thus the subject reader internally scans and discriminates data, and does so very simply by mechanical means.

DESCRIPTION OF THE PREFERRED EMBODIMENTS

Figure 1:
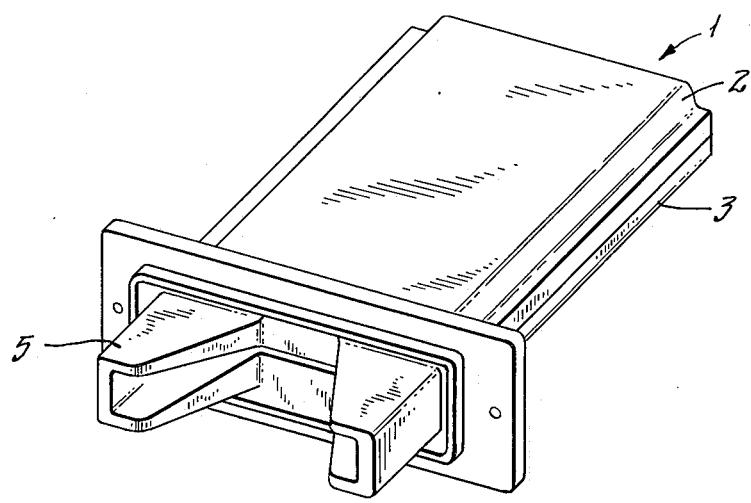
FIG. 1 is a perspective view of the punched card reader of the subject invention in its assembled form.

Referring to FIG. 1, the housing for the optical punched card reader of the subject invention is illustrated in its assembled form. Specifically, the housing includes a top cover 2, a bottom cover 3, and a card receiving member 5.

Figure 2:
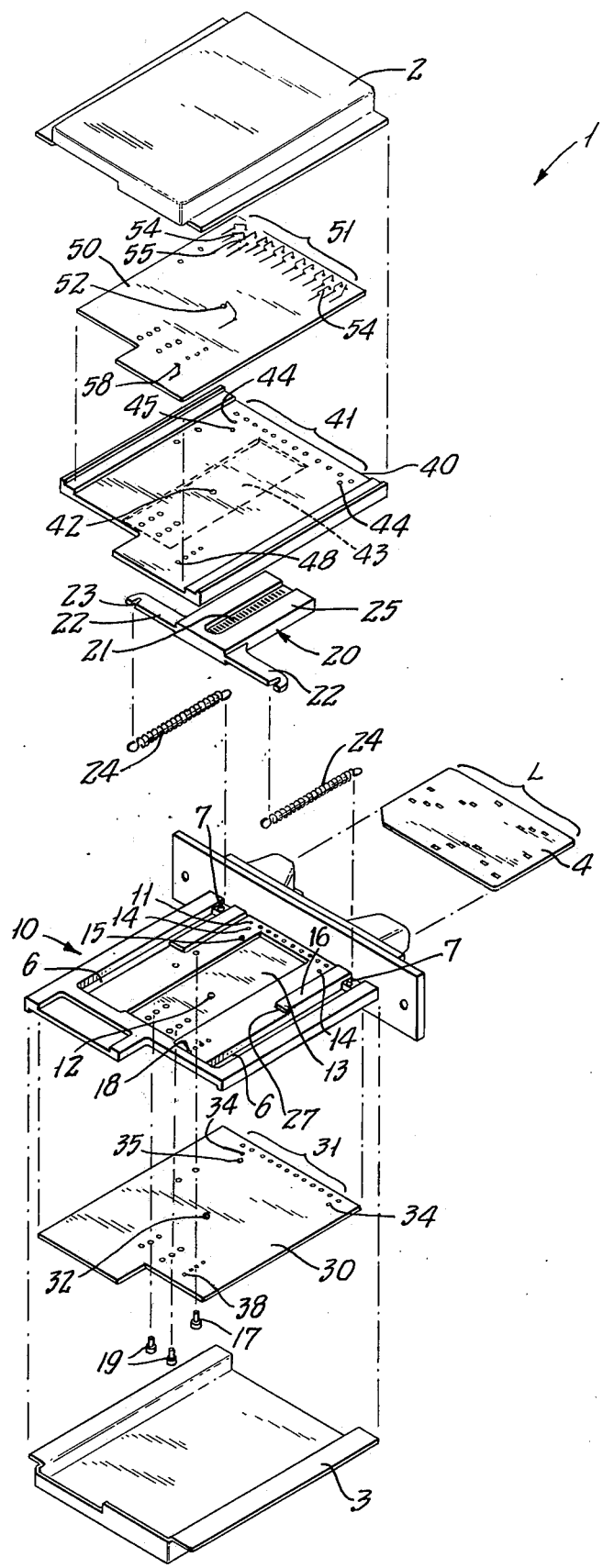
FIG. 2 is an exploded perspective view of the components of the subject card reader.

The subject card reader is adapted to serially read the columns of standard alpha-numeric Hollerith coded punched data cards. As illustrated in FIG. 2 the punched card 4 is in the form of a badge containing a plurality of rows and columns of data points. The card 4 is generally rectangular in configuration preferably having one corner thereof cut. As will be described later the dimensions of card 4 actually form part of the input code and a validity check in the card reader system.

Figure 3:
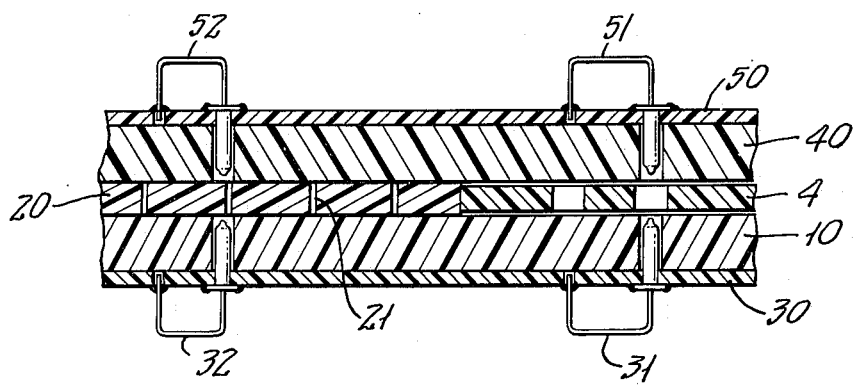
FIG. 3 is a side elevational cross-section of the operative portions of the subject card reader as a punched card is being inserted therein.

Referring to FIGS. 2 and 3, the operative portions of the subject card reader 1 are illustrated. More particularly, the reader 1 includes a base member 10 for slidably receiving the data card 4, and which is generally rectangular in configuration. A row of spaced data sensing apertures 11 is disposed along the front edge of plate member 10. The number of apertures 11 corresponds to the number of rows contained in card 4, and the spacing between said apertures corresponds to the spacing between the data card rows. As will be described below, data sensing apertures 11 cooperate with the punched holes of a data card 4 to transmit the data on said card for reading. Base member 10 also includes a centrally located strobe aperture 12, the function of which will become apparent below. In the preferred embodiment of the subject invention base member 10 further includes card position sensing apertures 14, card orientation sensing aperture 15, and end of card sensing aperture 18, all of which provide the subject card reader with a series of validity checks. It is also desirable that base member 10 include card cut corner stop pin 17 and end of card stops 19 which provide additional validity checks. The precise location of apertures 14, 15, and 18 as well as pins 17 and 19 depend upon the dimensions of card 4.

As is apparent from the drawings, upon insertion of card 4 into the reader 1, the card slidingly engages the top face of base plate 10. Accordingly, it is desirable that base 10 include a pair of elongated raised portions 16 which are disposed perpendicular to apertures 11, and extend from said apertures to an intermediate portion of base member 10. Raised portions 16 form a rigid channel for receiving and guiding the card 4. Preferably the distance between raised portions 16 is virtually the same as the length (L) of card 4.

Further referring to FIGS. 2 and 3 the subject card reader 1 includes a strobe generator 20 which is preferably T-shaped in configuration, having two arm portions 22 and a rectangular body portion 25, the strobe generator being slidably mounted on base plate 10. Preferably, the top face of the base plate 10 has a central portion of reduced thickness forming a rectangular channel 13 for receiving and guiding strobe generator 20, said channel extending from the row of data sensing apertures 11 to the opposite edge of base plate 10. Strobe aperture 12 is located in the center of channel 13. Channel 13 preferably has a width virtually the same as the width of the body portion 25 of strobe generator 20, and a depth less than the thickness of strobe generator 20. Strobe generator 20 includes a centrally located column of slots 21 disposed perpendicular to the data sensing apertures 11. The number of slots on strobe generator 20 corresponds to the number of columns on data card 4, and the spacing between the slots corresponds to the spacing between the columns of data card 4. Accordingly, as the card 4 is inserted into the reader 1, the card will displace strobe generator 20 away from data sensing apertures 11 such that slots 21 pass over strobe aperture 12 intermittently covering said aperture. In addition, when a slot of strobe generator 20 is aligned with strobe aperture 12, simultaneously, a column of data card 4 will be precisely aligned with the data sensing apertures 11.

In the preferred embodiment of the subject invention strobe generator 20 is biased so as to return to its normal position once data card 4 has been removed from the reader. As illustrated in FIG. 2, the arm members 22 of strobe generator 20 are disposed perpendicular to slots 21, said arm members 22 including notches 23 at each distal end thereof. Two helical spring members 24 which are each attached at one end to the notches 23 of arms 22, the other ends of said spring members being fixed to base member 10, at points 7, provide the biasing means for strobe generator 20. Preferably, base member 10 includes two groove portions 6 for housing spring members 24. It will be noted that edges 27 of raised portions 16 serve as stops for the spring biased strobe generator arms 22. In addition to aiding in biasing strobe generator 20, arms 22 perform another important function which will be described below.

Further referring to FIGS. 2 and 3, the card reader of the subject invention includes a first printed circuit board 30 which is similar in configuration to base member 10. As is apparent from the drawings, board 30 is mounted on the bottom face of base member 10. Board 30 includes a row of spaced light sources 31 which are aligned with and extend into the row of data sensing apertures 11 of base member 11. Board 30 also includes a centrally located light source 32 which is aligned with and extends into the centrally located aperture 12 of base member 10. Typically said light sources 31 and 32 may be light emitting diodes (LED's). In the preferred embodiment of the subject invention board 30 further includes card position light sources 34 and a card orientation light source 35 which are aligned with the card position apertures 14 and card orientation aperture 15, respectively of base member 10. In addition, board 30 also preferably includes a light source 38 which is aligned with the end of card sensing aperture 18. Further, board 30 also includes common circuitry (not shown) for connecting the board 30 to an appropriate power source and a read-out terminal or device.

Further referring to FIGS. 2 and 3 the card reader of the subject invention includes a base member cover plate 40 which is similar in configuration to base member 10, and which is mounted on the top surface thereof, over strobe generator 20. Cover plate 40 includes a row of spaced apertures 41, a centrally located aperture 42, two card position apertures 44, a card orientation aperture 45, and a card ending sensing aperture 48, aligned with the corresponding apertures 11, 12, 14, 15 and 18 of base member 10. In addition cover plate 40 includes a channel portion of reduced thickness 43 that is substantially identical to channel portion 13 of base plate 10. This aids in reducing possible friction as strobe generator is displaced by the insertion of a card.

Mounted on said base member cover plate 40 is a second printed circuit board 50 having substantially the same configuration as cover plate 40. Along one edge of said board 50 is a row of spaced light sensitive sensors 51 which are aligned with and extend into plate apertures 41. Board 50 also includes a centrally located light sensitive sensor 52 which is aligned with and extends into the centrally located base cover plate aperture 42. Board 50 further includes card position sensors 54, card orientation sensor 55, and end of card sensor 58 aligned with and extending into apertures 44, 45, and 48, respectively of cover plate 40. Typically the light sensors of board 50 may be phototransistors.

Figure 4:
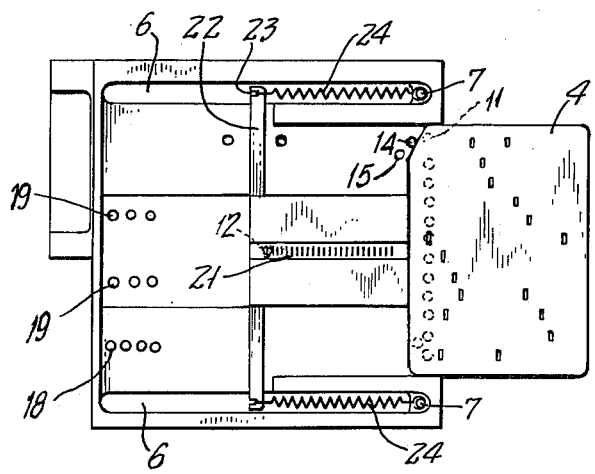
FIG. 4 is a plan view of the base member and strobe generator of the subject invention as a card is first inserted into the reader.
Figure 5:
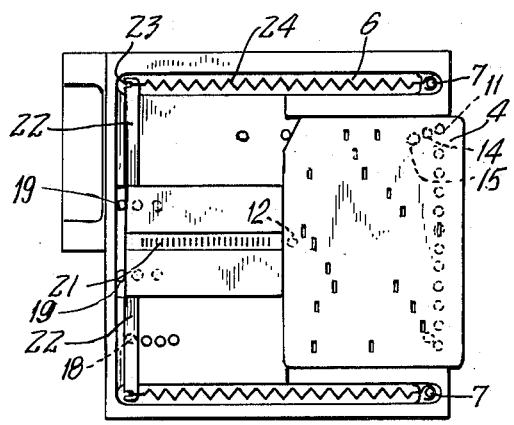
FIG. 5 is a plan view of the base member and strobe generator of the subject invention as a punched card is fully inserted.

In operation, (see FIGS. 4 and 5) as the card 4 is manually inserted into reader, the position of the card is sensed by phototransistors 54, through apertures 14 and 44. More particularly, the circuitry of the system will sense whether the card 4 has been correctly positioned (lengthwise), such that the columns of the card, not the rows, will be read serially depending on whether the light from both LED's 34 passes freely to phototransistors 54 or is blocked out by card 4. Similarly, the circuitry of the system will sense whether the card 4 is correctly oriented (as illustrated in FIG. 2, cut corner to the right) depending on whether the light from LED 35 passes freely to phototransistor 55, or is blocked out by the card 4. In addition, if the card 4 is not properly oriented, upon insertion of the card, pin 17 will prematurely stop the card, causing an incorrect combination of signals, and ultimate rejection of the data. Thus, it will be appreciated that the dimensions of the card, in effect, are part of the input code, and serve as a validity check.

As the card 4 is further inserted into the reader the columns of the card pass over apertures 11 and the signal created as the light from a LED's 31 passes through a punched hole in the card is received by a phototransistor 51. Simultaneously, as the card 4 is being inserted, strobe generator 20 is being displaced by the card away from apertures 11. As a result, the slots 21 of strobe generator 20 pass over strobe aperture 12 creating a series of intermittent light signals which are received by phototransistor 52.

As the card is fully inserted into the reader, arm 22 passes over aperture 18, thus intercepting the light from LED's 38. As a result, a signal is generated indicating to the system that the last readable position, i.e., the end of a valid card has been reached.

Strobe generator 20 performs several important functions. First, it "tells" the subject reader when to read. At the precise moment a strobe signal is transmitted (when one of the 22 slots of strobe generator 20 is aligned with strobe aperture 12) a column of the data card 4 is aligned with the data sensing apertures 11. Second, the combination of the strobe signal and data sensing signal from an aperture 11 "tells" the reader the exact location of the data input, i.e., the strobe signal provides the column component of the data while the signal from an aperture 11 provides the row component (thus the complete alpha-numeric code is transmitted). Third, it "tells" the reader how many more columns are to be read before the end of the data is reached. Fourth, as an arm 22 of the strobe generator passes over aperture 18, a signal is transmitted "telling" the system the exact time the reading of the data card should have been completed.

The scanning and discrimination of the pertinent data occur internally with respect to the reader and are independent of any particular time base. Strobing is initiated with the insertion of a card 4, and it proceeds at the rate at which the card is inserted. In addition, while the strobe generator 20 will generate signals at any position in which the data card is inserted, the system will become operational at some read-out terminal or device only if the card is inserted at the proper position and orientation, thus providing the appropriate combination of signals.

Thus, the intelligence in the data card is read out as the card moves in conjunction with the strobe generator; the card 4 moving across the sensing apertures 11, and the slots 21 of the strobe generator moving over strobe aperture 12. By intercepting the light paths between the LED's 31, 32, 34, 35, and 38 and the phototransistors 51, 52, 54, 55, and 58, a series of signals is produced commensurate with the pattern on the data card and its orientation, thus providing the proper read out of the intelligence contained therein. It should be noted that while the above description indicates that the transmission properly coded signals occurs as the data card is inserted into the reader, the card may be programmed in conjunction with the read-out device such that the proper combination of signals begins to be transmitted after full insertion of the card as the card moves toward the row of sensing apertures on its way out of the reader.

In summary, the subject invention provides a new and improved punched card reader that has several advantages over known devices. The subject reader is of very simple construction and is contained in a neat, compact package which is relatively inexpensive to manufacture. Instead of using external electrical scanning and discrimination means, the subject card reader employs an internal mechanical means of scanning and discriminating data. The subject reader provides an absolute data column count regardless of punched data, and operates completely independent of any time base. In addition, the subject reader provides a series of simple but complete validity checks thus preventing false data read-outs.

While the preferred embodiment of the subject invention has been described and illustrated, it would be obvious that various changes and modifications can be made therein without departing from the spirit of the invention which should be limited only by the scope of the appended claims.

What is claimed is:

1. An apparatus for reading a punched data card having a plurality of columns and rows comprising an assembly of components including:
   a base member for slidably receiving the punched card said base member having first and second opposed faces, said base member further having at one edge thereof a row of spaced data sensing apertures corresponding in number to the number of rows on the data card, said apertures being spaced approximately the same distance as the rows on the data card, said base member further including a centrally located strobe aperture;
   a strobe generator for cooperating with the data card for generating intermittent light signals as the data card is inserted into the reader, said strobe generator being slidably mounted on the first face of said base member, said strobe generator including a column of spaced slots disposed perpendicular to the row of spaced data sensing apertures of said base member, said slots corresponding in number to the number of columns on the data card, said strobe generator slots being spaced approximately the same distance as the spacing between the columns of the data card, said strobe generator being disposed such that the column of slots passes over the strobe aperture of the base member as the data card which is inserted into the reader displaces the strobe generator away from the row of apertures on the base member;
   a base member cover plate having substantially the same configuration as said base member, said cover plate being mounted on the first face of said base member over the strobe generator, said cover plate including a row of spaced openings aligned with the row of data apertures sensing of said base member, said cover plate further including a central opening aligned with the central aperture of the base member;
   a light source mounted on the second face of said base member within each of the apertures of said base member;
   light sensitive sensor mounted within each of the openings of said cover plate;
   electrical means for connecting said light sources and light sensors to a read-out device and power source; and
   a housing for enclosing said assembly of components, whereby movement of the data card over the row of apertures of the base member along with the simultaneous movement of the strobe generator over the strobe aperture of the base member generates a combination of signals for transmitting the data on the data card to a read-out device.

2. An apparatus for reading a punched data card as recited in claim 1 in which the strobe generator is generally T-shaped in configuration including a rectangular body portion and a pair of opaque arm members disposed perpendicular to the column of slots on said strobe generator.

3. An apparatus for reading a punched data card as recited in claim 1 in which the base member further includes a pair of spaced, elongated raised portions disposed perpendicular to the row of apertures of said base member and extending from said row of apertures to an intermediate portion of said base member, said raised portions being spaced a distance approximately equal to the length of the data card such that said raised portions form a rigid track for receiving and guiding the data card.

4. An apparatus for reading a punched data card as recited in claim 1 in which the base member further includes a portion of reduced thickness extending from the row of apertures of said base member to the opposite edge thereof, said portion of reduced thickness having a width approximately equal to the width of the strobe generator whereby said portion of reduced thickness forms a channel for slidably receiving and guiding the strobe generator.

5. An apparatus for reading a punched data card as recited in claim 4 in which the face of the base member cover plate immediately adjacent the base member is the mirror image of said adjacent face of the base member.

6. An apparatus for reading a punched data card as recited in claim 1 in which the strobe generator is biased so as to return to its original position after the data card has been removed from the reader.

7. An apparatus for reading a punched data card as recited in claim 6 in which the biasing means comprises a pair of helical spring members disposed perpendicular to the row of apertures on the base member said spring members, each having one end thereof affixed to an arm of the strobe generator, said spring members having their other ends fixed to the base member.

8. An apparatus for reading a punched data card as recited in claim 7 in which said base member further includes a pair of elongated groove portions for receiving the spring members, said groove portions extending from the row of apertures on the base member to the opposite end thereof.

9. An apparatus for reading a punched data card as recited in claim 1 which further includes means for detecting the proper position and orientation of the data card.

10. An apparatus for reading a punched data card as recited in claim 9 in which said means for detecting the proper position of the data card comprises: a pair of spaced card position light sources aligned with and extending into corresponding apertures in the base member, said light sources being spaced a distance slightly less than the length of the data card, and disposed parallel to said row of data sensing light sources; and a pair of spaced card position light sensors aligned with and extending into corresponding apertures in the base member cover plate, said card position light sources being aligned with the card position light sensors, whereby as the data card is inserted into the reader in the proper position said card will intercept the light from both card position light sources.

11. An apparatus for reading a punched data card as recited in claim 10 in the data card has one corner thereof cut and said means for detecting the proper orientation of the data card comprises a card orientation light source aligned with and extending into a corresponding card orientation aperture in the base member, and a card orientation light sensor aligned with and extending into a corresponding card orientation aperture in the base member cover plate, said card orientation apertures being aligned with each other whereby as the data card is inserted into the reader in the proper position and orientation, said card will intercept the light from both card position light sources and simultaneously permit free passage of the light from the card orientation light source.

12. An apparatus for reading a punched data card as recited in claim 1 which further includes means for detecting when the transmission of data from a valid data card should have been completed.

13. An apparatus for reading a punched data card as recited in claim 12 wherein said means for detecting when the transmission of data from a valid data card should have been completed comprises an end of card light sources aligned with and extending into a corresponding aperture in the base member, and an end of card light sensor aligned with and extending into a corresponding opening in the base member cover plate, said light source and light sensor being aligned with each other, whereby as the data card is fully inserted into the reader the opaque arm member of the strobe generator will intercept the light from the end of card light source.

14. An apparatus for reading a punched data card as recited in claim 1 wherein said light sources are light emitting diodes.

15. An apparatus for reading a punched data card as recited in claim 1 wherein said light sensors are phototransistors.

16. An apparatus for reading a punched data card having a plurality of columns and rows comprising an assembly of components including:
(a) a base member for slidably receiving the data card, said base member having first and second opposed faces, said base member further having at one edge thereof a row of spaced data sensing apertures corresponding in number to the number of rows on the data card, said row of apertures being spaced approximately the same distance as the rows on the data card, said base member further including a centrally located strobe aperture, said base member further including on its first face a pair of spaced elongated raised portions disposed perpendicular to the row of data sensing apertures and extending from said row of apertures to an intermediate portion of said base member, said raised portions being spaced a distance approximately equal to the length of the data card such that said raised portions form rigid track for receiving and guiding the data card, said base member further including on its first face a central portion of reduced thickness extending from said row of apertures to the opposite edge of the base member; said base member further including a card position detecting aperture, a card orientation sensing aperture, and an end of card sensing aperture, said base member further including a pair of spaced elongated slot portions disposed perpendicular to the row of apertures, said slot portions extending from one edge of the base member to the opposite edge thereof;
(b) a strobe generator for cooperating with the data card for continuously generating intermittent light signals as the data card is inserted into the reader, said strobe generator being slidably mounted in the portion of reduced thickness of the base member, said strobe generator being generally T-shaped in configuration, having a rectangular body portion and a pair of opaque arm members extending from the sides of said body portion and being disposed parallel to the row of data sensing apertures of the base member said arm members being further disposed such that as the data card is fully inserted into the reader an arm member passes over the end of card sensing aperture of the base member, the body portion of said strobe generator including a centrally located column of spaced slots disposed perpendicular to the row of data sensing apertures on said base member, said slots corresponding in number to the number of columns on the data card, said slots being spaced from each other a distance approximately equal to the distance between the columns on the data card, said strobe generator being disposed such that the column of slots thereof passes over the strobe aperture of the base member as the data card inserted into the reader displaces the strobe generator away from the row of apertures on the base member;
(c) a pair of helical springs each being disposed in an elongated slot portion of the base member, said slot portions being disposed perpendicular to the arms of said strobe generator, and extending from the row of apertures of the base member to the opposite edge thereof, each of said springs having one end thereof fixed to an arm member of the strobe generator, the other ends of said springs being fixed to the base member such that after the data card has been removed from the reader the strobe generator will return to its original position;
(d) a first printed circuit board mounted on the second face of the base member, having a light source aligned with and extending into each of the respective apertures of the base member, said circuit board further including circuitry for connecting the board to a power source and read-out device;
(e) a base member cover plate mounted on the first face of said base member, over the strobe generator, said cover plate having substantially the same configuration as said base member, said cover plate including a row of data sensing openings, a card position detecting opening, a card orientation sensing opening, a strobe opening, and an end of card sensing opening, all of said opening being aligned with the like apertures of the base member, said cover plate further including a portion of reduced thickness which is the mirror image of the portion of reduced thickness on the base member;
(f) a second printed circuit board mounted on the base member cover plate having a light sensor aligned with and extending into each of the respective openings of the base member cover plate, said second circuit board further including circuitry for connecting said circuit board to a power source and read-out device; and
(g) a housing for enclosing said assembly of components.

* * * * *